United States Patent
Chen et al.

(10) Patent No.: US 9,378,155 B2
(45) Date of Patent: Jun. 28, 2016

(54) METHOD FOR PROCESSING AND VERIFYING REMOTE DYNAMIC DATA, SYSTEM USING THE SAME, AND COMPUTER-READABLE MEDIUM

(71) Applicant: Acer Incorporated, New Taipei (TW)

(72) Inventors: Yu-Shian Chen, Taipei (TW); Chin-Laung Lei, Taipei (TW)

(73) Assignee: Acer Incorporated, New Taipei (TW)

( * ) Notice: Subject to any disclaimer, the term of this patent is extended or adjusted under 35 U.S.C. 154(b) by 591 days.

(21) Appl. No.: 13/741,397

(22) Filed: Jan. 15, 2013

(65) Prior Publication Data

US 2014/0108817 A1  Apr. 17, 2014

(30) Foreign Application Priority Data

Oct. 12, 2012 (TW) .............................. 101137778 A

(51) Int. Cl.
  G06F 21/64 (2013.01)
  G06F 12/14 (2006.01)
  H04L 29/06 (2006.01)
(52) U.S. Cl.
  CPC ............ *G06F 12/1408* (2013.01); *G06F 21/64* (2013.01); *H04L 63/123* (2013.01)
(58) Field of Classification Search
  CPC combination set(s) only.
  See application file for complete search history.

(56) References Cited

U.S. PATENT DOCUMENTS

| 5,651,099 | A | * | 7/1997 | Konsella | H04M 7/30 706/13 |
| 6,067,574 | A | * | 5/2000 | Tzeng | G06F 15/17337 707/999.101 |
| 6,411,957 | B1 | * | 6/2002 | Dijkstra | 707/752 |
| 6,981,151 | B1 | * | 12/2005 | Groeneveld | G06F 21/64 713/175 |
| 7,466,703 | B1 | * | 12/2008 | Arunachalam | H04L 45/00 370/351 |
| 7,903,666 | B1 | * | 3/2011 | Kumar | H04L 45/02 370/395.31 |
| 8,739,308 | B1 | * | 5/2014 | Roth | G06F 21/6218 380/45 |
| 2001/0010048 | A1 | * | 7/2001 | Kobayashi | G06F 17/30961 |
| 2002/0143747 | A1 | * | 10/2002 | Tal | G06F 17/30961 |
| 2002/0184504 | A1 | * | 12/2002 | Hughes | H04L 9/3236 713/177 |

(Continued)

FOREIGN PATENT DOCUMENTS

| TW | 200614688 | 5/2006 |
| TW | 200841199 | 10/2008 |
| TW | 201207645 | 2/2012 |

OTHER PUBLICATIONS

Goodrich et al., "Efficient Authenticated Dictionaries with Skip Lists and Commutative Hashing", Tech. Rep.,Johns Hopkins Information Security Institute, Oct. 2001, p. 1-p. 15.

*Primary Examiner* — Taghi Arani
*Assistant Examiner* — Phy Anh Vu
(74) *Attorney, Agent, or Firm* — Jianq Chyun IP Office

(57) ABSTRACT

A method for processing and verifying remote dynamic data is provided. The method includes providing a radix tree structure having N levels, obtaining and recording N initial values for representing the empty radix tree structure, wherein all nodes at the same level are assigned an identical initial value. When performing a data processing operation to the radix tree structure, determining a first leaf node and calculating and recording the value of each node in a shortest path from the first leaf node to the root node. When performing a verification of a specific data, obtaining a second leaf node corresponding to the specific data, a sibling node of each node in a shortest path from the second leaf node to the root node, and generating a verification result according to a digital signature for verifying the root node, the value of each obtained sibling node, and the specific data.

17 Claims, 6 Drawing Sheets

(56) References Cited

U.S. PATENT DOCUMENTS

| | | | |
|---|---|---|---|
| 2003/0130981 A1* | 7/2003 | Nehru | G06F 17/30327 |
| 2003/0172362 A1* | 9/2003 | Mack-Crane et al. | 716/12 |
| 2003/0198291 A1* | 10/2003 | Gold | H04N 19/61 |
| | | | 375/240.01 |
| 2003/0225907 A1* | 12/2003 | Krishnan | H04L 45/00 |
| | | | 709/238 |
| 2004/0001497 A1* | 1/2004 | Sharma | H04L 45/02 |
| | | | 370/401 |
| 2004/0081157 A1* | 4/2004 | Hassan-Ali | G06F 7/24 |
| | | | 370/395.1 |
| 2004/0210588 A1* | 10/2004 | Simkins | H04L 29/12132 |
| 2004/0236720 A1* | 11/2004 | Basso | G06F 17/30985 |
| 2004/0249712 A1* | 12/2004 | Brown | G06Q 30/02 |
| | | | 705/14.19 |
| 2006/0161583 A1* | 7/2006 | Burka | G06F 9/44521 |
| 2007/0091797 A1* | 4/2007 | Ma | H04L 12/5693 |
| | | | 370/229 |
| 2009/0077076 A1* | 3/2009 | Berger | G06F 17/30327 |
| 2009/0327904 A1 | 12/2009 | Guzak et al. | |
| 2010/0296517 A1* | 11/2010 | Kompella | H04L 45/02 |
| | | | 370/408 |
| 2011/0044352 A1* | 2/2011 | Chaitou | H04L 45/04 |
| | | | 370/408 |
| 2012/0269303 A1* | 10/2012 | Paker | H04L 25/03242 |
| | | | 375/341 |

* cited by examiner

METHOD FOR PROCESSING AND VERIFYING REMOTE DYNAMIC DATA, SYSTEM USING THE SAME, AND COMPUTER-READABLE MEDIUM

CROSS-REFERENCE TO RELATED APPLICATION

This application claims the priority benefit of Taiwan application serial no. 101137778, filed on Oct. 12, 2012. The entirety of the above-mentioned patent application is hereby incorporated by reference herein and made a part of this specification.

BACKGROUND OF THE INVENTION

1. Field of the Invention

The invention relates generally to a method for processing and verifying remote data, and more particularly to a method for processing and verifying dynamic data stored remotely, a system implementing the method, and a computer-readable medium.

2. Description of Related Art

With the rise of cloud computing, various types of cloud services have increasingly gained attention. For example, cloud storage services integrate multiple servers through the Internet to provide a storage environment for consumer or enterprise clients to store data. The cloud storage services ensure the users with ease of access to the data under a web-enabled environment, while also serving the data backup and sharing purposes.

Typically speaking, data security and integrity determine whether cloud storage services are good or bad. Users of cloud storage service usually require fast and easy verification of whether remotely stored data has been completely saved properly, and whether certain specific and important data has been damaged. If the remotely stored data of the user belongs to static data needing no further modifications, data structures suitable for the static data have been widely applied in cloud storage services for which data integrity verification is easy. However, for dynamic data that the user needs to constantly modify or delete, if the data structure for storing static data is used for the storage of dynamic data, because data quantity cannot be maintained and the data structures need to be frequently reestablished, a high calculation cost is required.

SUMMARY OF THE INVENTION

Accordingly, the invention provides a method, system, and computer-readable medium for processing and verifying remote dynamic data, capable of providing a stable and efficient verification mechanism for dynamic data stored remotely, and effectively determining the integrity of the remote dynamic data.

The invention provides a method for processing and verifying remote dynamic data, the method includes providing a radix tree structure for data storage. The radix tree structure includes a root node, a plurality of intermediate nodes, and a plurality of leaf nodes. Moreover, the radix tree structure has N levels, in which N is a positive integer. The method further includes obtaining and recording N initial values for representing the radix tree structure with no data stored, in which all nodes at the same level are assigned an identical initial value in the radix tree structure with no data stored. The method further includes when performing a data processing operation to the radix tree structure, determining a first leaf node from the plurality of leaf nodes, recalculating a value of each node in a shortest path from the first node to the root node, and recording the value obtained from the recalculation. The method further includes when performing a verification of a specific data to the radix tree structure, obtaining at least one second leaf node from the plurality of leaf nodes corresponding to the specific data, obtaining a sibling node of each node in a shortest path from each of the at least one second leaf node to the root node, and generating a verification result of the specific data according to a current digital signature for verifying the root node, the value of each obtained sibling node, and the specific data.

From another perspective, the invention provides a computer method having a plurality of instructions for executing a method for processing and verifying remote dynamic data, the method including the following steps. A radix tree structure is provided for data storage. The radix tree structure includes a root node, a plurality of intermediate nodes, and a plurality of leaf nodes. Moreover, the radix tree structure has N levels, in which N is a positive integer. N initial values are obtained and recorded for representing the radix tree structure with no data stored, in which all nodes at the same level are assigned an identical initial value in the radix tree structure with no data stored. When performing a data processing operation to the radix tree structure, a first leaf node from the plurality of leaf nodes is determined. A value of each node in a shortest path from the first node to the root node is recalculated, and the value obtained from the recalculation is recorded. When performing a verification of a specific data to the radix tree structure, at least one second leaf node from the plurality of leaf nodes corresponding to the specific data is obtained, a sibling node of each node in a shortest path from each of the at least one second leaf node to the root node is obtained, and a verification result of the specific data is generated according to a current digital signature for verifying the root node, the value of each obtained sibling node, and the specific data.

From yet another perspective, the invention provides a system for processing and verifying remote dynamic data, including a data storage server and a client device capable of connecting and transmitting information to each other. The data storage server includes a database and a database management unit coupled to each other. The database provides a radix tree structure for data storage. The radix tree structure includes a root node, a plurality of intermediate nodes, and a plurality of leaf nodes. Moreover, the radix tree structure has N levels, in which N is a positive integer. The database management unit obtains and records N initial values for representing the radix tree structure with no data stored, in which all nodes at the same level are assigned an identical initial value. When the client device requests to perform a data processing operation to the radix tree structure, the database management unit determines a first leaf node from the plurality of leaf nodes, recalculates a value of each node in a shortest path from the first leaf node to the root node, records the value obtained from the recalculation, and transmits a current digital signature for verifying the root node to the client device through the network. When the client device requests to perform a verification of a specific data to the radix tree structure, the database management unit obtains at least one second leaf node from the plurality of leaf nodes corresponding to the specific data, obtains a sibling node of each node in a shortest path from each of the at least one second leaf node to the root node, and transmits the current digital signature for verifying the root node, the value of each obtained sibling node, and the specific data to the client device through the network. Accordingly, the client device generates a verification result of the specific data according to the current digital signature, the received value of each sibling node, and the received specific data.

In summary, according to embodiments of the invention, when the radix tree structure is used to store remote dynamic data, the values of all the nodes in the radix tree structure are not recorded, but only the nodes which generated value changes due to each data processing operation are recorded. Accordingly, the dynamic processing of data is facilitated, and the processing speed of large amount of data can be enhanced. For data verification aspects, embodiments of the invention can verify the integrity of each data item by utilizing the digital signature recorded at the root node and the sibling nodes of all nodes in a shortest path from the specific leaf node to the root node. Moreover, a negative query can be performed on each data item. The radix tree structure allows the user to utilize the client device to rapidly and easily verify whether data has been properly and completely stored in the remote data storage server, and accordingly, the trust which the user has for the data storage server can be enhanced.

In order to make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate embodiments and, together with the description, serve to explain the principles of the invention.

DESCRIPTION OF EMBODIMENTS

With the rapid development of cloud technologies, consumer or enterprise users have become accustomed to storing data on the data storage servers provided by cloud companies. When the user requests to store dynamic data that requires constant modifications or insertions/deletions, because the data quantity is not constant, the conventionally used data structures suitable for static data cannot provide the ideal processing speed. Based on the afore-described needs, embodiments of the invention provide a radix tree structure, and also provide a method using the radix tree structure for processing and verifying data, a system using the method, and a computer-readable medium. Compared to conventional data structures, by adopting the radix tree structures provided by embodiments of the invention, the processing time required for each data alteration can be shortened, while the integrity and accuracy for a large amount of data can be rapidly verified.

Figure 1:
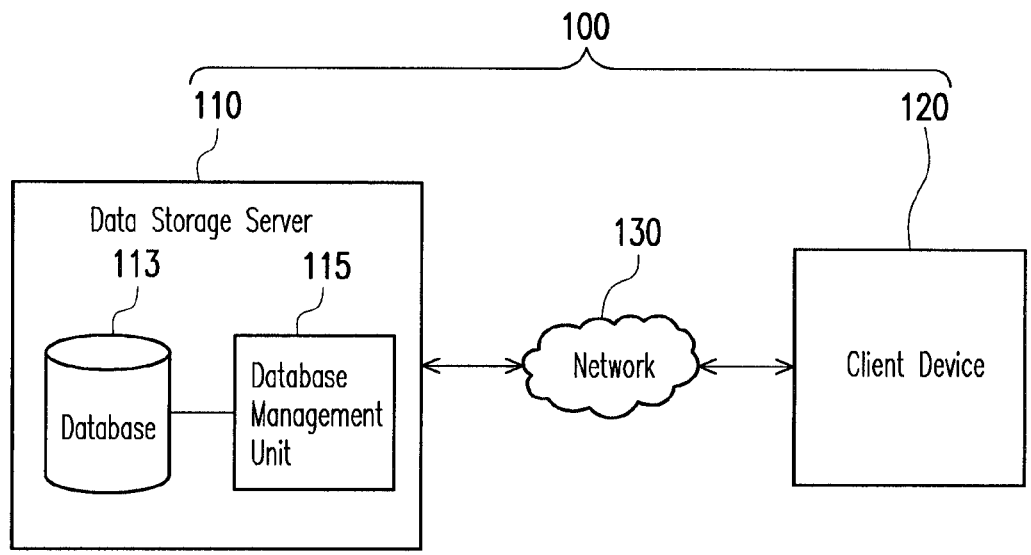
FIG. 1 is a schematic diagram of an environment for processing and verifying remote dynamic data according to an embodiment of the invention.

FIG. 1 is a schematic diagram of an environment for processing and verifying remote dynamic data according to an embodiment of the invention. With reference to FIG. 1, a data storage server 110 and a client device 120 transmit data to each other through a network 130. The network 130 may be the internet, although the invention is not limited thereto. The client device 120 may be a computer system, a mobile device, or any device capable of connecting to the network, and the type of device is not limited by the invention.

The data storage server 110 is managed by a cloud company providing a cloud storage service. It should be noted that, although only one data storage server 110 is illustrated in FIG. 1 for clarity of description, in practice the cloud company can simultaneously control a plurality of data storage servers to provide the cloud storage service. When a user obtains access rights of the cloud storage service from the cloud company, the user can upload and store the data in the client device 120 in the data storage server 110. The same data uploaded from the client device 120 may be stored in a single data storage server, or stored distributed among a plurality of data storage servers.

The data storage server 110 includes a database 113 and a database management unit 115 coupled to each other. The database 113 stores data by adopting the radix tree structure, which is described later with the accompanied figures. The database 113 may be a storage medium such as a traditional hard disk drive (HDD) or a solid state drive (SSD), for example. Alternatively, the database 113 may also be stored in other types of storage devices, and the invention is not limited thereto.

In one embodiment, the database management unit 115 is a hardware element having data computing and processing capabilities, such as a central processor, a chipset, a microprocessor, a programmable controller, an Application Specific Integrated Circuit (ASIC), other similar devices, or a combination of the foregoing devices. In another embodiment, the database management unit 115 may also be a software element having data computing and processing capabilities, such as an operating system or an application program, for example. Alternatively, the database management unit 115 may be a combination of the afore-described hardware elements and software elements. The database management unit 115 is adapted to manage a content of the database 113, including processing operations such as insertion, deletion, and updating of data according to the requests of the client device 120. Moreover, database management unit 115 can obtain and transmit information needed to verify a specific data corresponding to the requests of the client device 120, for the client device 120 to perform a verification.

In the present embodiment, the data storage server 110 and the client device 120 form a remote dynamic data processing and verifying system 100. In the remote dynamic data processing and verifying system 100, when the user requests to perform various types of dynamic operations on the data stored in the data storage server 110, the data storage server 110 can rapidly complete the processing. When the user requests to verify the integrity and accuracy for a large amount of data in the data storage server 110, the data storage server 110 only sends the necessary information back to the client device 120, so that the client device 120 can easily generate a verification result.

Figure 2:
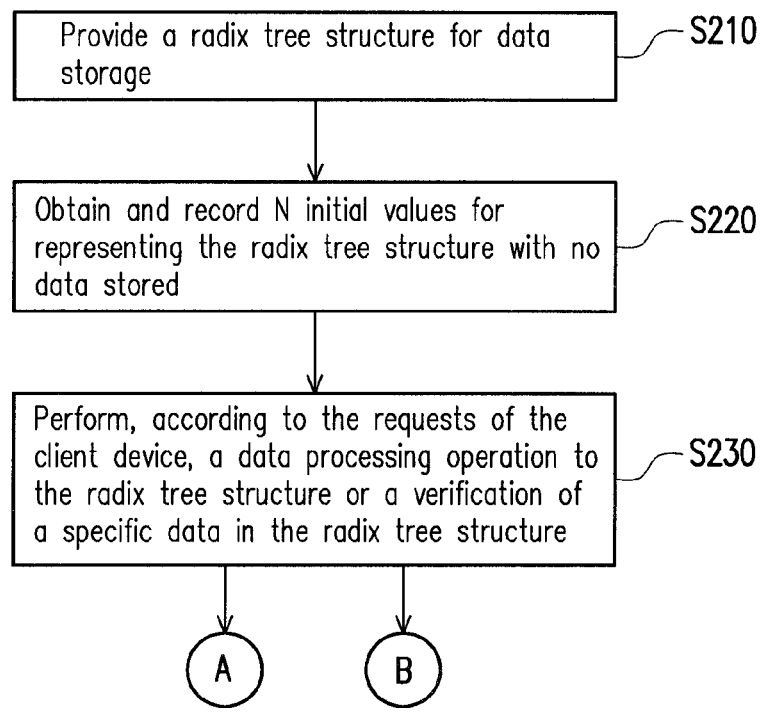
FIG. 2 is a flow diagram illustrating a method for processing and verifying remote dynamic data according to an embodiment of the invention.

In the description hereafter, FIG. 2 is used to illustrate the detailed operation of the remote dynamic data processing and verifying system 100. Please refer to FIGS. 1 and 2.

In Step S210, the database 113 provides a radix tree structure for data storage. The radix tree structure includes a root node, a plurality of intermediate nodes, and a plurality of leaf nodes. The leaf nodes store a user data from the client device 120, and the intermediate nodes and the root node store an information needed to perform a verification of the user data for storage. In the present embodiment, the radix tree structure has N levels, and N is a positive integer greater than or equal to 2. For example, N may be 20, although the invention is not limited thereto.

As shown in Step S220, the database management unit 115 obtains and records N initial values for representing the radix tree structure with no data stored. To facilitate description, the radix tree structure with no data stored is referred to as an empty radix tree structure.

In the radix tree structures shown in the present embodiment, a degree of each node except the leaf nodes is 2. Accordingly, the radix tree structure having N levels has a total of $2^N-1$ nodes, in which $2^{N-1}$ are leaf nodes, 1 root node, and the rest are intermediate nodes. As the value of N increases, the number of leaf nodes of the radix tree structure becomes larger, and accordingly a larger amount of user data can be stored. It should be noted that, in the radix tree structure with no data stored, all nodes at the same level are assigned an identical initial value. Therefore, even though the radix tree structure having N levels has $2^N-1$ nodes, in practice only a storage space of N initial values is needed to represent an entire empty radix tree structure. In the present embodiment, the database management unit 115 obtains N initial values by the following equation (1):

$$\varepsilon_L = \begin{cases} H(\varepsilon_{L+1}, \varepsilon_{L+1}), & 0 \le L \le N-2 \\ C, & L = N-1 \end{cases} \quad (1)$$

In equation (1), C is a predetermined constant (e.g. 0), H(x,y) may be a predetermined hash function with x and y respectively being the first and second input values, although the invention is not limited thereto. $\varepsilon_L$ represents an initial value assigned by the database management unit 115 to all nodes at the $L^{th}$ level in the radix tree structure with no data stored. The leaf nodes are located at the $(N-1)^{th}$ level, and the root node is located at the $0^{th}$ level. If the predetermined constant is 0, then in the empty radix tree structure, all of the leaf nodes located at the $(N-1)^{th}$ level are assigned to $\varepsilon_{N-1}$ (e.g. 0). Moreover, all of the nodes located at the $(N-2)^{th}$ level are assigned to $\varepsilon_{N-2}$, which is the result obtained from feeding 0 and 0 respectively into the first and second input values of the hash function, and so on.

Figure 3:
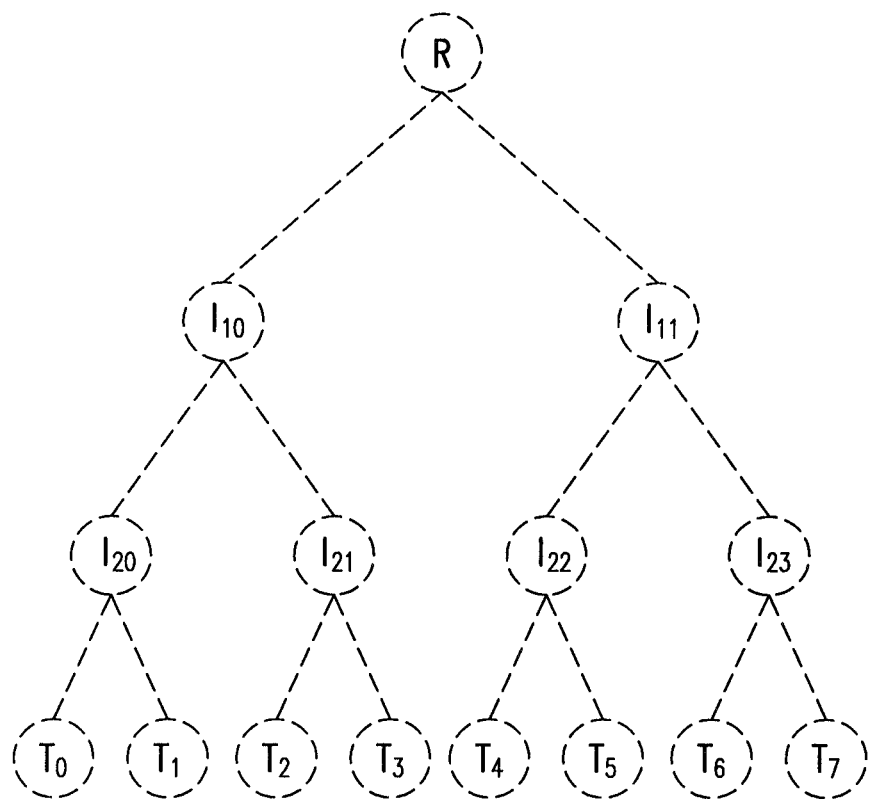
FIG. 3 is a schematic view of a radix tree structure with no data stored according to an embodiment of the invention.

FIG. 3 is a schematic view of a radix tree structure with no data stored according to an embodiment of the invention. With reference to FIG. 3, in the present embodiment, a radix tree structure 300 has 4 levels and a total of 15 nodes, including a root node R, 6 intermediate nodes $I_{10}$, $I_{11}$, $I_{20}$, $I_{21}$, $I_{22}$, and $I_{23}$, and 8 leaf nodes $T_0$, $T_1$, $T_2$, $T_3$, $T_4$, $T_5$, $T_6$, and $T_7$. Since the radix tree structure 300 has no user data stored, the database management unit 115 only needs 4 initial values to represent the empty radix tree structure 300. These 4 initial values may be obtained by calculating the aforementioned equation (1), for example. The value of the root node R is the initial value $\varepsilon_0$, the values of the intermediate nodes $I_1$ and $I_{11}$ are the initial value $\varepsilon_1$, the values of the intermediate nodes $I_{20}$, $I_{21}$, $I_{22}$, and $I_{23}$ are the initial value $\varepsilon_2$, and the values of the leaf nodes $T_0$, $T_1$, $T_2$, $T_3$, $T_4$, $T_5$, $T_6$, and $T_7$ are the initial value $\varepsilon_3$.

Returning to Step S230 of FIG. 2, the database management unit 115 performs a data processing operation to the radix tree structure such as data inserting, deleting, or updating according to the requests of the client device 120 (Step A), or the database management unit 115 performs a verification of a specific data in the radix tree structure corresponding to the requests of the client device 120 (Step B). Steps A and B are described in detail later with the accompanying figures.

As described earlier, the database management unit 115 uses N initial values to represent a radix tree structure having N levels and with no data stored. Therefore, the storage space required by an empty radix tree structure in practice is a storage space of N initial values, which is far less than the storage space required for storing each node of the radix tree structure. Even after data has been stored in the radix tree structure, each time a data processing operation is performed, the database management unit 115 would only update and store the values of the nodes related to this data processing operation. Accordingly, the values of all the nodes of the radix tree structure do not need to be updated and stored for each data processing operation.

Figure 4:
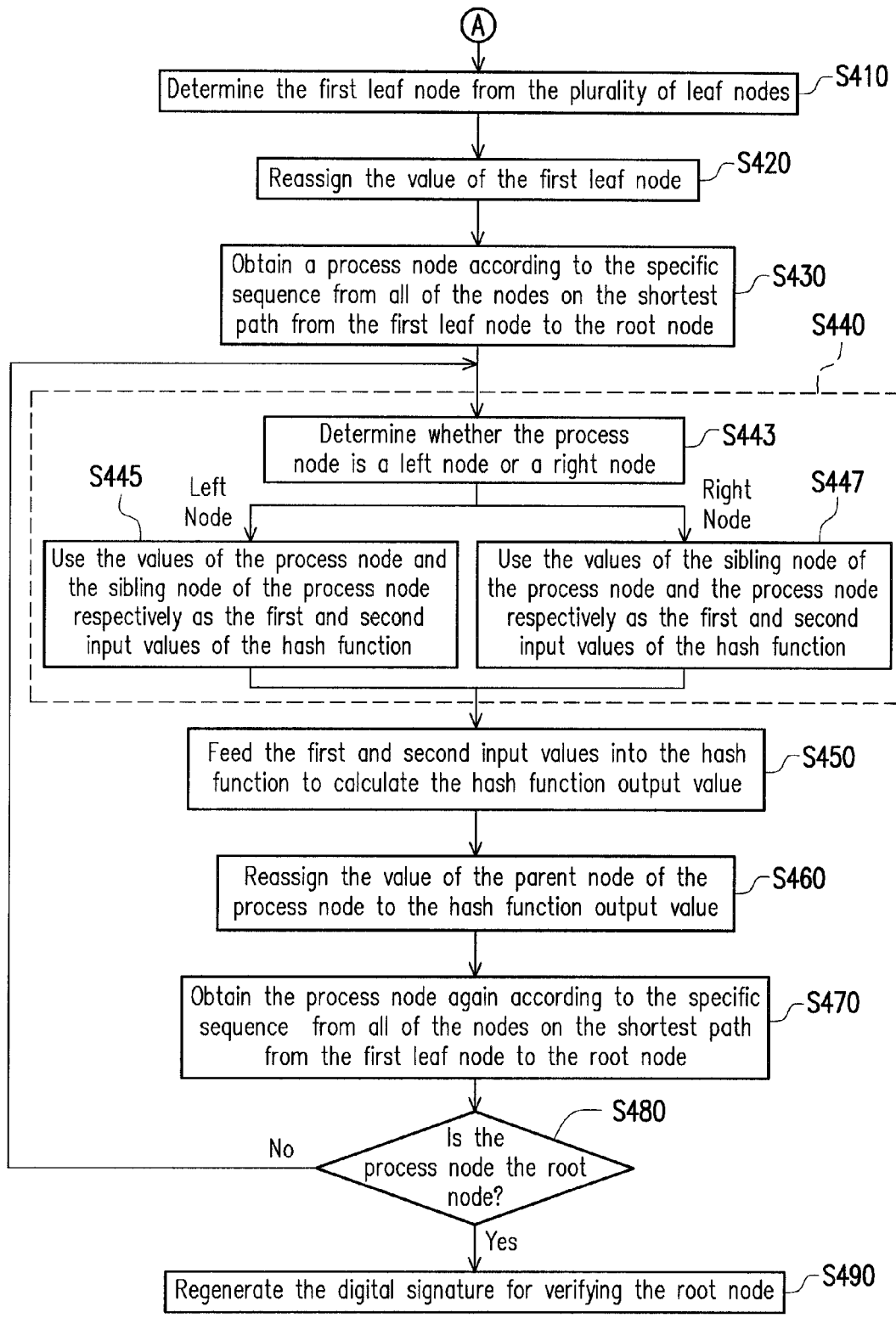
FIG. 4 is a flow diagram illustrating a data processing operation performed to a radix tree structure according to an embodiment of the invention.

FIG. 4 is a flow diagram illustrating a data processing operation performed to a radix tree structure according to an embodiment of the invention. Please refer to FIG. 4. In the present embodiment, assume the data storage server 110 receives a request from the client device 120, and a data processing operation needs to be performed to the radix tree structure. The data processing operation includes inserting a target data to the radix tree structure, using the target data to update an old data stored in the radix tree structure, or deleting the target data from the radix tree structure.

As shown in Step S410, the database management unit 115 determines a first leaf node from all of the leaf nodes. Specifically, the database management unit 115 feeds the target data into the predetermined hash function, and thereby obtain a hash value of the target data. The database management unit 115 then performs a corresponding functional calculation on the hash value of the target data and a total number of all the leaf nodes, such as a modulus calculation (i.e., a remainder obtained by dividing the hash value of the target data by the total number of leaf nodes), so as to determine the first leaf node from all of the leaf nodes. In other words, each data item corresponds to a stable leaf node through the afore-described mapping functional calculation. For example, assuming the total number of leaf nodes is LN, the database management unit 115 can have all of the leaf nodes correspond to identification (ID) codes 0 to LN−1 from left to right sequentially. After obtaining the remainder to the hash value of the target data divided by LN, the leaf node having the ID code equal to this remainder is used as the first leaf node.

In Step S420, the database management unit 115 reassigns the value of the first leaf node. In the present embodiment, each leaf node can store more than two data items. In view of the above, the database management unit 115 first determines whether the first leaf node is used to store another data different from and unrelated to the target data. Specifically, the other data is not composed of the target data, and the other data is not generated from the target data.

If the first leaf node is not used to store other data, when the data processing operation is to delete the target data from the radix tree structure, the data management unit 115 reassigns the value of the first leaf node to the initial value assigned to the leaf nodes when the radix tree structure has no data stored (e.g., the initial value $\varepsilon_{N-1}$ obtained from equation (1)). Moreover, when the data processing operation is to insert the target data to the radix tree structure, the database management unit 115 reassigns the value of the first leaf node to the hash value of the target data. It should be noted that, inserting the target data includes adding the target data to the radix tree structure, or using the target data to update the old data already added to the radix tree structure.

If the first leaf node is used to store other data, the current value in the first leaf is generated by the hash value of other data and the hash value of the target data. When the data processing operation is to delete the target data from the radix tree structure, the database management unit 115 reassigns the value of the first leaf node to the hash value of the other data, such that the first leaf node is not used to store the target data. Moreover, when the data processing operation is to insert the target data to the radix tree structure, the database management unit 115 reassigns the value of the first leaf node according to the target data and the other data. For example, the database management unit 115 combines the target data and the other data into an integrated data, and the integrated data is fed into the hash function to obtain a hash value of the integrated data. In addition, the value of the first leaf node is assigned to the hash value of the integrated data. Alternatively, the database management unit 115 combines the hash value of the target data and the hash value of the other data into an integrated hash value, and then reassigns the value of the first leaf node to the integrated hash value.

In another embodiment, in order to lower the computation cost of the data processing operations, each leaf node is only used to store one data item. Accordingly, the database 113 provides a radix tree structure having a greater number of levels, thereby decreasing the probability of corresponding multiple data items to the same leaf node. Using a radix tree structure having 20 levels as an illustrative example, since the radix tree structure has $2^{20}$ leaf nodes, the probability of two data items corresponding to the same leaf node is only approximately one in a million (i.e. $\frac{1}{2}^{20}$). Even so, if multiple data items corresponding to the same leaf node still occurred, the methods in the afore-described embodiments can be adopted for a specific processing. Since the data quantity storable by a single leaf node is far less than the data quantity storable by the entire radix tree structure, if a data error occurs at a certain leaf node, the efficiency of specifically processing this leaf node is far higher than processing the entire data.

After updating the value of the first leaf node, the database management unit 115 recalculates the value of each node in a shortest path from the first leaf node to the root node, and records the value obtained from the recalculation.

Since all the nodes on the shortest path from the first leaf node to the root node form an ordered set, therefore, as shown in Step S430, the database management unit 115 obtains a process node from these nodes according to a specific sequence. The specific sequence begins from the first leaf node and is directed toward a direction of the root node following back each ancestor node per level. That is, while executing Step S430 for the first time, the database management unit 115 obtains the first leaf node to serve as the process node. While executing Step S430 for the second time, the database management unit 115 obtains a parent node of the first leaf node to serve as the process node, and so on.

In Step S440, the database management unit 115 uses the value of the process node and the value of a sibling node of the process node for the first and second input values of the predetermined hash function H(x,y) according to a left and right branch sequence. The sibling nodes refer to nodes in the radix tree structure having the same parent node as the process node. Specifically, as shown in Step S443, the database management unit 115 determines whether the process node is a left node or a right node.

If the process node is the left node, then as shown in Step S445, the database management unit 115 uses the values of the process node and the sibling node of the process node respectively as the first and second input values of the hash function. If the process node is the right node, then as shown in Step S447, the database management unit 115 uses the values of the sibling node of the process node and the process node respectively as the first and second input values of the hash function.

As shown in Step S450, the database management unit 115 feeds the first and second input values into the hash function to calculate a hash function output value. Moreover, in Step S460, the value of the parent node of the process node is reassigned to the hash function output value.

In Step S470, the database management unit 115 again obtains a process node according to the specific sequence from all nodes in a shortest path from the first leaf node to the root node. In addition, as shown in Step S480, whether the process node is the root node is determined.

If the process node is not the root node, the procedure returns to Step S440, and Step S440 to Step S480 are repeated.

If the process node is the root node, then as shown in Step S490, the database management unit 115 regenerates a digital signature for verifying the root node, and transmits this digital signature to the client device 120 through the network 130. Up to this point, the procedure flow of the data processing operation is complete.

As shown in FIG. 4, when the database management unit 115 performs a data processing operation, the nodes that have generated value changes are only the nodes in a shortest path from the first leaf node to the root node. If the radix tree structure has a sufficient number of N levels, then there are enough leaf nodes. While using the radix tree structure, since a majority of the leaf nodes have no data stored, each insertion of data can be directly stored in the corresponding leaf node, without the need of changing the framework of the entire radix tree structure. Accordingly, the efficiency of dynamic data insertion can be enhanced. Moreover, nodes with no data stored do not need to occupy extra storage space. Therefore, even though the node quantity of the radix tree structure is large, in practice the storage space needed to record the radix tree structure is smaller than the storage space required by all of the nodes.

Figure 5:
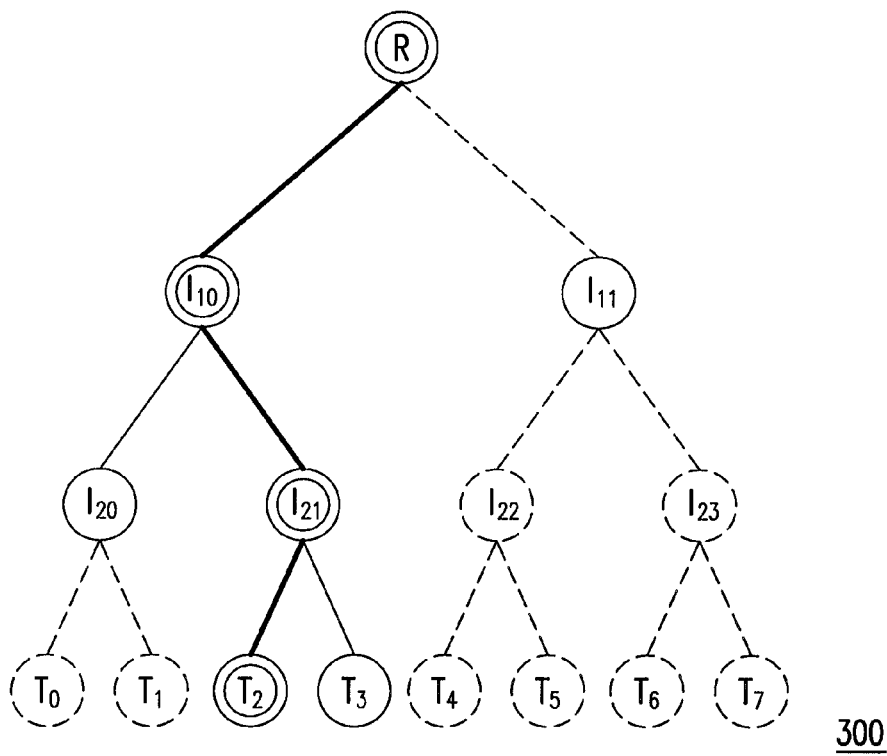
FIGS. 5 and 6 are schematic views of inserting a target data to a radix tree structure according to an embodiment of the invention.

FIG. 5 is a schematic view of inserting a target data to a radix tree structure 300 with no data stored according to an embodiment of the invention. With reference to FIG. 5, in the present embodiment, assuming the first leaf node determined by the database management unit 115 according to the target data is the leaf node $T_2$, the database management unit 115 first assigns the value of the first leaf node $T_2$ to the hash value of the target data. All the nodes on the shortest path from the first leaf node $T_2$ to the root node R are obtained. Moreover, according to the specific sequence, the first leaf node $T_2$, the intermediate node $I_{21}$, the intermediate node $I_{10}$, and the root node R serve as the process node, and the values thereof are updated.

For example, when the process node is the leaf node $T_2$, since the sibling node thereof (i.e. leaf node $T_3$) has no user data stored, the database management unit 115 would accommodate this data processing operation and assign the value of the leaf node $T_3$ to the initial value $\epsilon_3$ obtained from equation (1). Since the leaf node $T_2$ is the left node, the database management unit 115 uses the value of the leaf node $T_2$ as the first input value and uses the value of the leaf node $T_3$ as the second input value, so as to obtain the hash function output value from calculating equation (1). Moreover, the hash function output value is used as the value of the parent node (i.e. intermediate node $I_{21}$) of the leaf node $T_2$.

The database management unit 115 then uses the intermediate node $I_{21}$ as the process node. Similarly, since the sibling node (i.e. intermediate node $I_{20}$ f the intermediate node $I_{21}$ has no user data stored, the database management unit 115 would accommodate this data processing operation and assign the value of the intermediate node $I_N$ to the initial value $\epsilon_2$ obtained from equation (1). The value of the intermediate node $I_{21}$ is used as the second input value and the value of the intermediate node $I_{20}$ is used as the first input value to calculate the hash function output value. The value of the parent node (i.e. intermediate node $I_{10}$) of the intermediate node $I_{21}$ is assigned to the hash function output value.

The database management unit 115 then uses the intermediate node $I_{10}$ as the process node. Since the sibling node (i.e. intermediate node $I_{11}$) of the intermediate node $I_{10}$ has no user data stored, the database management unit 115 would accommodate this data processing operation and assign the value of the intermediate node $I_{11}$ to the initial value $\epsilon_1$ obtained from equation (1). Moreover, the value of the intermediate node $I_{11}$ is used as the second input value and the value of the intermediate node $I_{10}$ is used as the first input value for feeding into equation (1) to calculate the hash function output value. The value of the parent node (i.e. root node R) of the intermediate node $I_{10}$ is assigned to the hash function output value.

Thereafter, the database management unit 115 obtains the root node R as the process node, and regenerates a digital signature for verifying the root node R. Up to this point, the procedure flow of inserting the target data to the radix tree structure 300 is complete. In the foregoing embodiment, for this data processing operation, the database management unit 115 only needs to update and store the values of 4 nodes in practice. The values of the unmodified nodes do not require extra processing and also do not require extra storage space.

Figure 6:
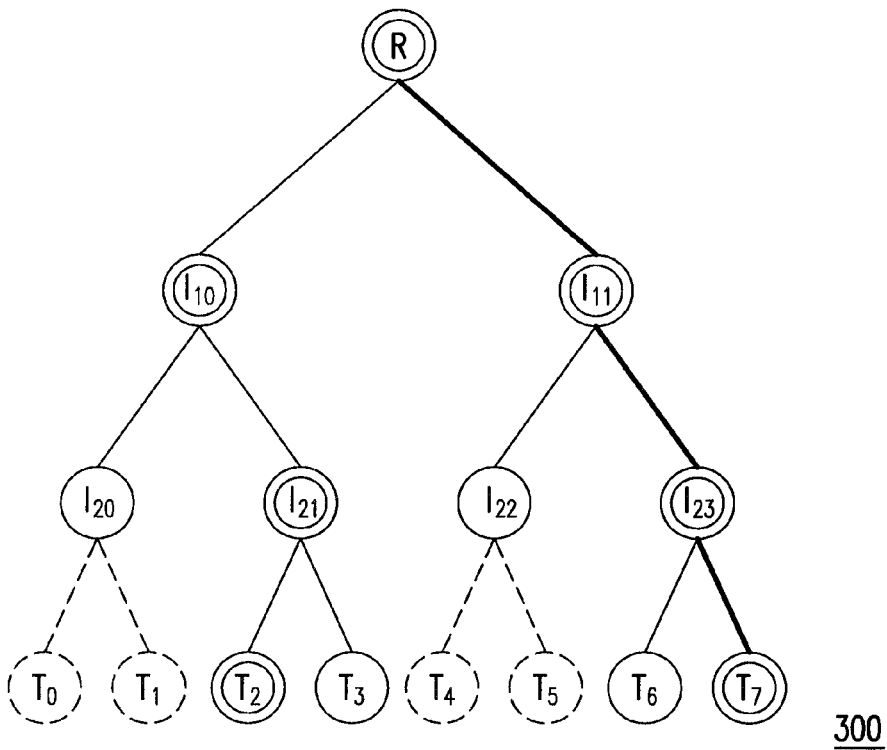

Continuing the embodiment shown in FIG. 5, FIG. 6 is a schematic view of inserting another target data to a radix tree structure 300 according to an embodiment of the invention. In the present embodiment, the database management unit 115 determines the first leaf node to be the leaf node $T_7$. Therefore, for this data processing operation, the database management unit 115 in practice only needs to update and store the values of 4 nodes: the leaf node $T_7$, the intermediate node $I_{23}$, the intermediate node $I_{11}$, and the root node R. Since the procedure flow is similar to the afore-described embodiments, further elaboration thereof is omitted.

Assuming the client device 120 requests to update the data stored in the leaf node $T_7$, after the database management unit 115 receives the target data from the client device 120, the hash value of the target data is calculated. Moreover, the value of the leaf node $T_7$ is reassigned to this hash value, and the values of the intermediate node $I_{23}$, the intermediate node $I_{11}$, and the root node R are updated in sequence for these 4 nodes. Accordingly, the data update operation is complete.

Thereafter, assuming the client device 120 requests to delete the data recorded in the leaf node $T_7$, the database management unit 115 reassigns the value of the leaf node $T_7$ to the initial value $\epsilon_3$ obtained from calculating equation (1), and the values of the intermediate node $I_{23}$, the intermediate node $I_{11}$, and the root node R are updated in sequence for these 4 nodes. The radix tree structure 300 after deletion is shown in FIG. 5.

In view of the above, the data storage server 110 first provides an empty radix tree structure having a high number of levels. Even though the empty radix tree structure has a substantially high number of nodes, in practice only a plurality of initial values matching the level number is needed to represent the entire radix tree structure. Therefore, a large amount of storage space is not needed. Thereafter, each time a data processing operation such as an insertion, deletion, or update operation needs to be performed, no changes are required to the whole radix tree structure itself. The leaf nodes used for data storage can be directly selected, and only the values of the related leaf nodes, intermediate nodes, and root node are required to be updated and recorded. Accordingly, the processing speed of dynamic data operation can be drastically enhanced, and the size of the required storage space is reasonable.

For the client device 120, only the values of the nodes modified by the latest data processing operation need to be recorded, and the rest of the information is recorded by the data storage server 110. Accordingly, even if the user data quantity becomes more immense, the load burden on the client device 120 is not increased.

Figure 7:
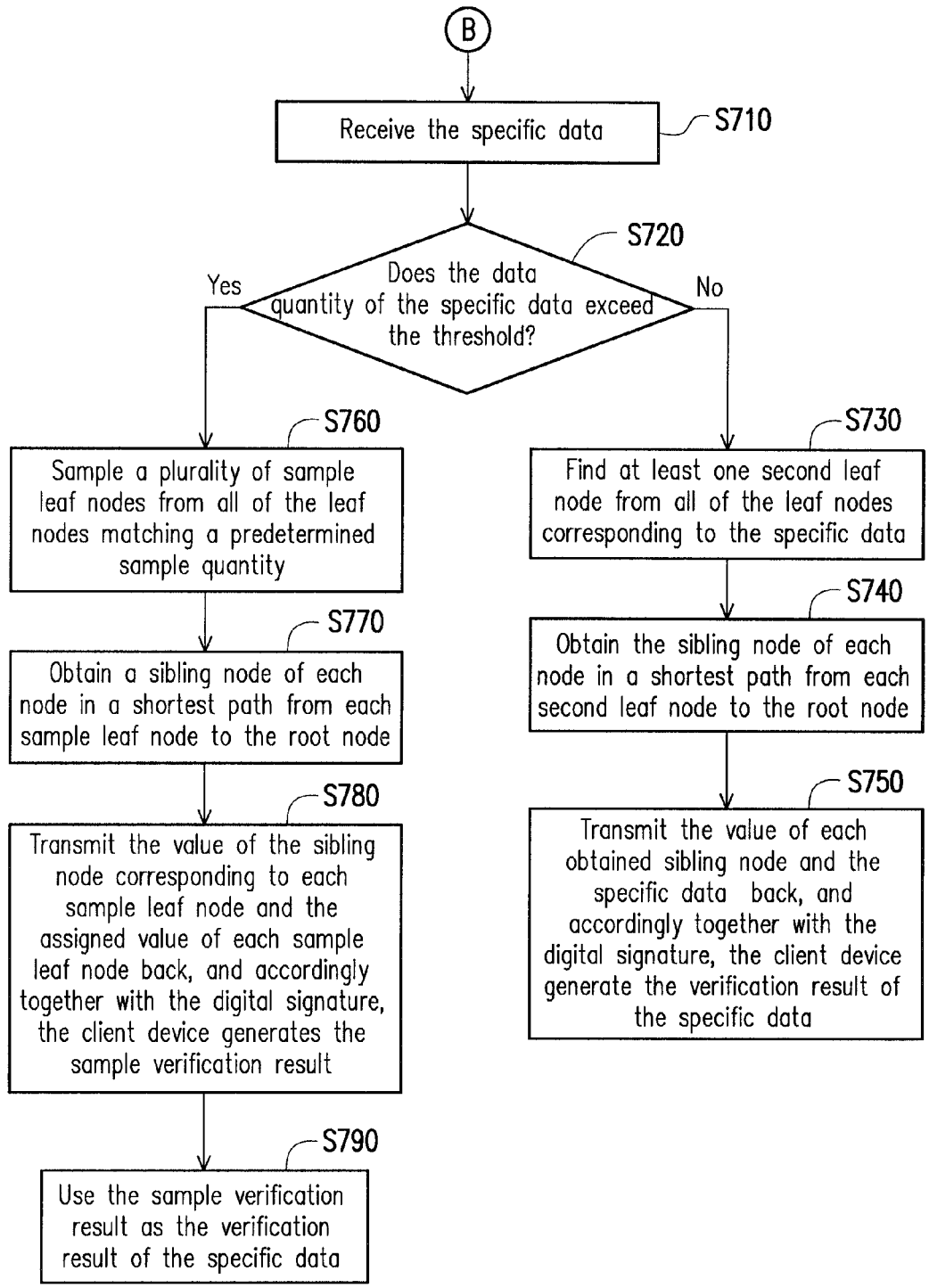
FIG. 7 is a flow diagram illustrating a verification of a specific data performed to a radix tree structure according to an embodiment of the invention.

FIG. 7 is a flow diagram illustrating a verification of a specific data performed to a radix tree structure according to an embodiment of the invention. In the present embodiment, a verification result includes confirming whether the specific data is stored in the radix tree structure and/or confirming the integrity of the specific data.

The client device 120 may send a specific data verification request to the data storage server 110 through the network 130. As shown in Step S710, the data management unit 115 receives the specific data.

In Step S720, the data management unit 115 determines whether a data quantity of the specific data has exceeded a threshold. The threshold may be a gigabyte (GB), for example, although the invention is not limited thereto.

When the data quantity of the specific data has not exceeded the threshold, then as shown in Step S730, the data management unit 115 can employ a modulus computation to find one or a plurality of second leaf nodes from all of the leaf nodes corresponding to the specific data. Since a same file may be divided into a plurality of sub-data and stored in different leaf nodes, therefore, when the specific data to be verified is stored in a single node, the quantity of the second leaf node is 1. When the specific data to be verified is distributed among multiple nodes, the quantity of the second leaf node is larger than 1.

In Step S740, the data management unit 115 obtains the sibling node of each node in a shortest path from each second leaf node to the root node. Moreover, as shown in Step S750, the data management unit 115 transmits the value of each obtained sibling node and the specific data itself back to the client device 120. Accordingly, the client device 120 generates the verification result of the specific data according to the aforementioned data from the data storage server 110 and the latest digital signature recorded in the client device 120.

Figure 8:
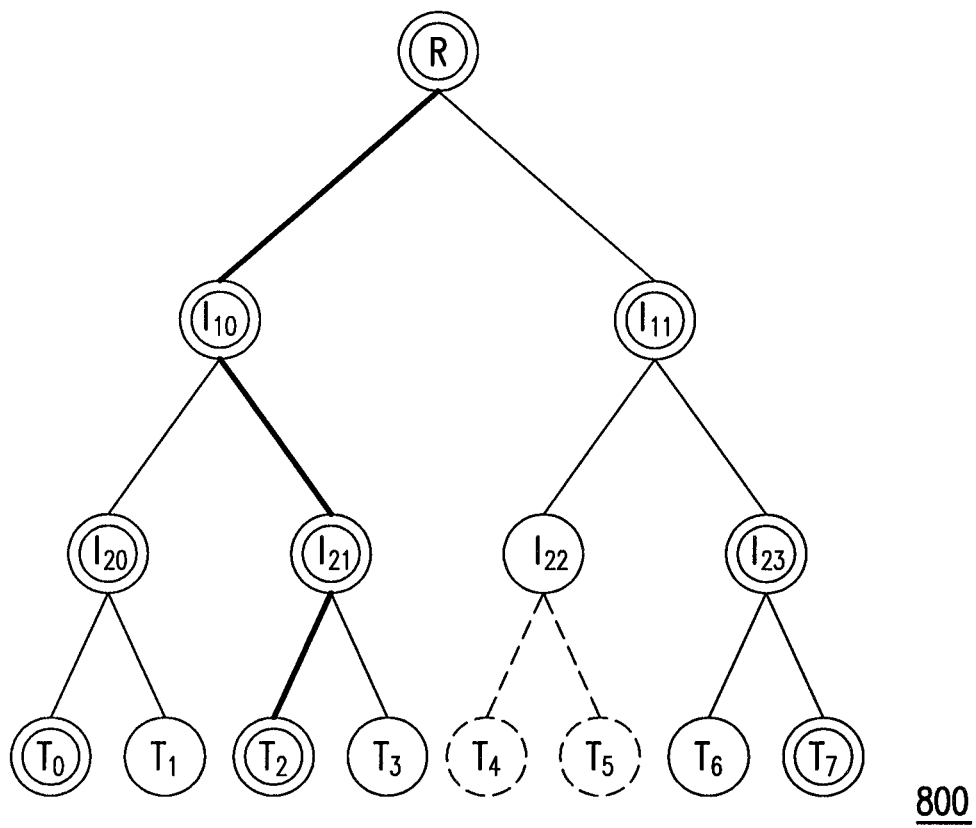
FIG. 8 is a schematic view of verifying a specific data in a radix tree structure according to an embodiment of the invention.

Using FIG. 8 as an illustrative example, in the present embodiment assume the client device 120 requests to verify a specific data in a radix tree structure 800. When the data management unit 115 receives the specific data from the client device 120, first a second leaf node (e.g. leaf node $T_2$) in all of the leaf nodes corresponding to the specific data is determined. The data management unit 115 then obtains all of the nodes in a shortest path from the leaf node $T_2$ to the root node R (e.g., leaf node $T_2$, intermediate node $I_{21}$, intermediate node $I_{10}$, and root node R). Thereafter, the values of the respective sibling nodes (e.g., leaf node $T_3$, intermediate node $I_{20}$, and intermediate node $I_{11}$) of the leaf node $T_2$, the intermediate node $I_{21}$, and the intermediate node $I_{10}$ are obtained.

The afore-described values of the sibling nodes and the specific data itself are transmitted back to the client device 120. Since the client device 120 knows the type of hash function the data storage server has adopted, therefore, the integrity of the specific data can be verified by using the same kind of hash function, the latest digital signature recorded in the client device 120 and used to verify the root node R, and the received information. Furthermore, the client device 120 can use the aforementioned information to perform a negative query to ensure that the specific data is not stored in the radix tree structure.

Returning to Step S720, when the data quantity of the specific data has exceeded the threshold, the database management unit 115 uses a statistical sampling principle to perform the verification.

Specifically, as shown in Step S760, the database management unit 115 samples a plurality of sample leaf nodes from all of the leaf nodes matching a predetermined sample quantity. In the present embodiment, the predetermined sample quantity may be a preset value (e.g., 460, although the invention is not limited thereto), or a value related to the total number of leaf nodes.

In Step S770, the data management unit 115 obtains a sibling node of each node in a shortest path from each sample leaf node to the root node. Moreover, in Step S780, the data management unit 115 transmits the value of the sibling node corresponding to each sample leaf node and the assigned value of each sample leaf node back to the client device 120. Accordingly, the client device 120 generates a sample verification result according to the aforementioned data from the data storage server 110 and the latest digital signature recorded in the client device 120. As shown in Step S790, the client device 120 then uses the sample verification result as the verification result of the specific data.

In one embodiment of the invention, the afore-described methods for processing and verifying remote dynamic data may be embodied as computer-readable code on a computer-readable medium. The computer-readable code may include a plurality of instructions which implement each step of the afore-described methods for processing and verifying remote dynamic data after being executed. For example, the computer-readable medium is any data storage device that can store data which can be thereafter read by a computer system. Examples of computer-readable media include read-only memory (ROM), random-access memory (RAM), compact disc read-only memory (CD-ROM), magnetic tapes, floppy disks, optical data storage devices, and carrier waves (e.g. data transmission through the Internet), and the invention is not limited thereto.

In view of the foregoing, the method, system, and computer-readable medium for processing and verifying remote dynamic data according to embodiments of the invention can rapidly verify the integrity of large amount of data stored remotely. Accordingly, the client can quickly and easily obtain the verification result. Moreover, the client can execute a negative query to verify that a certain data item is not stored remotely.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. A method for processing and verifying remote dynamic data provided by a remote dynamic data processing and verifying system, wherein the remote dynamic data processing and verifying system comprise a data storage server and a client device, the method comprising:

providing, by a storage medium of the data storage server, a radix tree structure for data storage, the radix tree structure comprising a root node, a plurality of intermediate nodes, and a plurality of leaf nodes, and the radix tree structure has N levels, N being a positive integer;

obtaining N initial values by using an equation (1):

$$\varepsilon_L = \begin{cases} H(\varepsilon_{L+1}, \varepsilon_{L+1}), & 0 \le L \le N-2 \\ C, & L = N-1 \end{cases}, \quad (1)$$

wherein C is a predetermined constant, H(x,y) is a hash function with x and y respectively being a first input value and a second input value of the hash function, $\varepsilon L$ represents an assigned initial value of the nodes at the Lth level in the radix tree structure with no data stored, wherein the leaf nodes are located at the (N−1)th level, and the root node is located at the 0th level;

obtaining and recording, by a processor of the data storage server, the N initial values for representing the radix tree structure with no data stored, wherein all nodes at the same level are assigned an identical initial value in the radix tree structure with no data stored and the initial value of the nodes at the different level are different;

when performing a data processing operation to the radix tree structure by a client device, determining a first leaf node from the plurality of leaf nodes by the processor of the data storage server, recalculating a value of each node in a shortest path from the first leaf node to the root node, and recording the value obtained from the recalculation by the processor of the data storage server; and when performing a verification of a specific data to the radix tree structure by the client device, obtaining at least one second leaf node from the plurality of leaf nodes corresponding to the specific data, obtaining a sibling node of each node in a shortest path from each of the at least one second leaf node to the root node, and generating a verification result of the specific data according to a current digital signature for verifying the root node, the value of each obtained sibling node, and the specific data by the processor of the data storage server.

2. The method of claim 1, wherein the step of determining the first leaf node from the plurality of leaf nodes comprises:

feeding a target data corresponding to the data processing operation into a hash function to obtain a hash value of the target data;

performing a corresponding functional calculation on the hash value of the target data and a total number of the leaf nodes; and determining the first leaf node from the plurality of leaf nodes according to a result of the corresponding functional calculation.

3. The method of claim 2, wherein after the step of determining the first leaf node, the method further comprises:

determining whether the first leaf node is also used to store other data, wherein the other data and the target data are different and unrelated;

if the first leaf node is not used to store the other data, when the data processing operation is to delete the target data from the radix tree structure, reassigning the value of the first leaf node to the initial value, and when the data processing operation is to insert the target data to the radix tree structure, reassigning the value of the first leaf node to the hash value of the target data; and if the first leaf node is also used to store the other data, when the data processing operation is to delete the target data from the radix tree structure, reassigning the value of the first leaf node to a hash value of the other data, and when the data processing operation is to insert the target data to the radix tree structure, reassigning the value of the first leaf node according to the target data and the other data.

4. The method of claim 3, wherein the step of reassigning the value of the first leaf node according to the target data and the other data comprises:
combining the target data and the other data into an integrated data;
feeding the integrated data into the hash function to obtain a hash value of the integrated data; and
reassigning the value of the first leaf node to the hash value of the integrated data.

5. The method of claim 3, wherein the step of reassigning the value of the first leaf node according to the target data and the other data comprises:
combining the hash value of the target data and the hash value of the other data into an integrated hash value; and
reassigning the value of the first leaf node to the integrated hash value.

6. The method of claim 2, wherein the step of recalculating the value of each node in a shortest path from the first leaf node to the root node comprises:
a. obtaining a process node from all of the nodes in the shortest path from the first leaf node to the root node according to a specific sequence, wherein the specific sequence begins from the first leaf node and is directed toward a direction of the root node following back each ancestor node per level;
b. using the value of the process node as one of a first input value and a second input value of the hash function and using the value of a sibling node of the process node as the other one of the first input value and the second input value of the hash function, according to a left and right branch sequence of the process node and the sibling node of the process node in the radix tree structure;
c. feeding the first input value and the second input value into the hash function to obtain a hash function output value;
d. reassigning the value of a parent node of the process node to the hash function output value; and
e. repeating steps a. to d. until the process node is the root node, and regenerating the digital signature for verifying the root node.

7. The method of claim 1, wherein the verification result comprises at least one of confirming whether the specific data is stored in the radix tree structure and confirming the integrity of the specific data.

8. The method of claim 1, further comprising:
when a data quantity of the specific data has exceeded a threshold, sampling a plurality of sample leaf nodes from the plurality of leaf nodes matching a predetermined sample quantity;
obtaining a sibling node of each node in a shortest path from each of the sample leaf nodes to the root node;
generating a sample verification result according to the current digital signature for verifying the root node, the value of the sibling node corresponding to each of the sample leaf nodes, and the assigned value of each of the sample leaf nodes; and
using the sample verification result as the verification result of the specific data.

9. A non-transitory computer-readable medium having a plurality of instructions for executing a method for processing and verifying remote dynamic data provided by a remote dynamic data processing and verifying system, wherein the remote dynamic data processing and verifying system comprise a data storage server and a client device, the method comprising the following steps:
providing, by a storage medium of the data storage server, a radix tree structure for data storage, the radix tree structure comprising a root node, a plurality of intermediate nodes, and a plurality of leaf nodes, and the radix tree structure has N levels, N being a positive integer;
wherein the step of obtaining the N initial values comprises using an equation (1):

$$\varepsilon_L = \begin{cases} H(\varepsilon_{L+1}, \varepsilon_{L+1}), & 0 \le L \le N-2 \\ C, & L = N-1 \end{cases}, \quad (1)$$

wherein C is a predetermined constant, H(x,y) is a hash function with x and y respectively being a first input value and a second input value of the hash function, $\varepsilon_L$ represents an assigned initial value of the nodes at the Lth level in the radix tree structure with no data stored, wherein the leaf nodes are located at the (N−1)th level, and the root node is located at the 0th level; obtaining and recording, by a processor of the data storage server, the N initial values for representing the radix tree structure with no data stored, wherein all nodes at the same level are assigned an identical initial value in the radix tree structure with no data stored and the initial value of the nodes at the different level are different; when performing a data processing operation to the radix tree structure by a client device, determining a first leaf node from the plurality of leaf nodes by the processor of the data storage server, recalculating a value of each node in a shortest path from the first leaf node to the root node, and recording the value obtained from the recalculation by the processor of the data storage server; and when performing a verification of a specific data to the radix tree structure by the client device, obtaining at least one second leaf node from the plurality of leaf nodes corresponding to the specific data, obtaining a sibling node of each node in a shortest path from each of the at least one second leaf node to the root node, and generating a verification result of the specific data according to a current digital signature for verifying the root node, the value of each obtained sibling node, and the specific data by the processor of the data storage server.

10. The non-transitory computer-readable medium of claim 9, wherein the step of determining the first leaf node from the plurality of leaf nodes comprises:
feeding a target data corresponding to the data processing operation into a hash function to obtain a hash value of the target data;
performing a corresponding functional calculation on the hash value of the target data and a total number of the leaf nodes; and
determining the first leaf node from the plurality of leaf nodes according to a result of the corresponding functional calculation.

11. The non-transitory computer-readable medium of claim 10, wherein after the step of determining the first leaf node, the method further comprises:

when the data processing operation is to delete the target data from the radix tree structure, reassigning the value of the first leaf node to the initial;

when the data processing operation is to insert the target data to the radix tree structure, reassigning the value of the first leaf node to the hash value of the target data;

when the data processing operation is to insert the target data to the radix tree structure, determining whether the first leaf node has been assigned to a hash value of another data, wherein the other data and the target data are different, and a hash value of the other data is different than the initial value assigned to the leaf nodes when the radix tree structure has no data stored;

if the first leaf node has not been assigned to the hash value of the other data, reassigning the value of the first leaf node to the hash value of the target data; and if the first leaf node has been assigned to the hash value of the other data, reassigning the value of the first leaf node according to the target data and the other data.

12. The non-transitory computer-readable medium of claim 11, wherein the step of reassigning the value of the first leaf node according to the target data and the other data comprises:

combining the target data and the other data into an integrated data;

feeding the integrated data into the hash function to obtain a hash value of the integrated data; and reassigning the value of the first leaf node to the hash value of the integrated data.

13. The non-transitory computer-readable medium of claim 11, wherein the step of reassigning the value of the first leaf node according to the target data and the other data comprises:

combining the hash value of the target data and the hash value of the other data into an integrated hash value; and reassigning the value of the first leaf node to the integrated hash value.

14. The non-transitory computer-readable medium of claim 10, wherein the step of recalculating the value of each node in a shortest path from the first leaf node to the root node comprises:

a. obtaining a process node from all of the nodes in the shortest path from the first leaf node to the root node according to a specific sequence, wherein the specific sequence begins from the first leaf node and is directed toward a direction of the root node following back each ancestor node per level; b. using the value of the process node as one of a first input value and a second input value of the hash function and using the value of a sibling node of the process node as the other one of the first input value and the second input value of the hash function, according to a left and right branch sequence of the process node and the sibling node of the process node in the radix tree structure;

c. feeding the first input value and the second input value into the hash function to obtain a hash function output value;

d. reassigning the value of a parent node of the process node to the hash function output value; and e. repeating steps a. to d. until the process node is the root node, and regenerating the digital signature for verifying the root node.

15. The non-transitory computer-readable medium of claim 9, wherein the verification result comprises at least one of confirming whether the specific data is stored in the radix tree structure and confirming the integrity of the specific data.

16. The non-transitory computer-readable medium of claim 9, the method further comprising:

when a data quantity of the specific data has exceeded a threshold, sampling a plurality of sample leaf nodes from the plurality of leaf nodes matching a predetermined sample quantity;

obtaining a sibling node of each node in a shortest path from each of the sample leaf nodes to the root node;

generating a sample verification result according to the current digital signature for verifying the root node, the value of the sibling node corresponding to each of the sample leaf nodes, and the assigned value of each of the sample leaf nodes; and using the sample verification result as the verification result of the specific data.

17. A system for processing and verifying remote dynamic data, the system comprising:

a hardware data storage server, comprising:
a database providing a radix tree structure for data storage, the radix tree structure comprising a root node, a plurality of intermediate nodes, and a plurality of leaf nodes, and the radix tree structure has N levels, N being a positive integer; and
a database management unit coupled to the database, the database management unit obtaining and recording N initial values for representing the radix tree structure with no data stored, wherein all nodes at the same level are assigned an identical initial value in the radix tree structure with no data stored and the initial value of the nodes at the different level are different, and the N initial values are obtained by using an equation (1):

$$\varepsilon_L = \begin{cases} H(\varepsilon_{L+1}, \varepsilon_{L+1}), & 0 \leq L \leq N-2 \\ C, & L = N-1 \end{cases}, \quad (1)$$

wherein C is a predetermined constant, H(x,y) is a hash function with x and y respectively being a first input value and a second input value of the hash function, $\varepsilon L$ represents an assigned initial value of the nodes at the Lth level in the radix tree structure with no data stored, wherein the leaf nodes are located at the (N−1)th level, and the root node is located at the 0th level; and a client device connected to the hardware data storage server through a network, wherein when the client device requests to perform a data processing operation to the radix tree structure, the database management unit determines a first leaf node from the plurality of leaf nodes, recalculates a value of each node in a shortest path from the first leaf node to the root node, records the value obtained from the recalculation, and transmits a current digital signature for verifying the root node to the client device through the network, when the client device requests to perform a verification of a specific data to the radix tree structure, the database management unit obtains at least one second leaf node from the plurality of leaf nodes corresponding to the specific data, obtains a sibling node of each node in a shortest path from each of the at least one second leaf node to the root node, and transmits the value of each obtained sibling node and the specific data to the client device through the network, and the client device generates a verification result of the specific data according to the current digital signature for verifying the root node, the received value of each sibling node, and the received specific data.

* * * * *